(12) United States Patent
Koike et al.

(10) Patent No.: US 7,822,353 B2
(45) Date of Patent: Oct. 26, 2010

(54) IMAGE FORMING APPARATUS

(75) Inventors: Kazuo Koike, Kanagawa (JP); Takashi Inoue, Saitama (JP); Hideharu Shiota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 875 days.

(21) Appl. No.: 11/547,558

(22) PCT Filed: Mar. 2, 2006

(86) PCT No.: PCT/JP2006/004527

§ 371 (c)(1),
(2), (4) Date: Oct. 5, 2006

(87) PCT Pub. No.: WO2006/098206

PCT Pub. Date: Sep. 21, 2006

(65) Prior Publication Data

US 2007/0212101 A1    Sep. 13, 2007

(30) Foreign Application Priority Data

Mar. 15, 2005    (JP) .............................. 2005-074053

(51) Int. Cl.
*G03G 15/00* (2006.01)
(52) U.S. Cl. ......................................... 399/81; 399/126
(58) Field of Classification Search .................... 399/81, 399/83, 126, 185, 411, 1, 107
See application file for complete search history.

(56) References Cited

U.S. PATENT DOCUMENTS

| | | | |
|---|---|---|---|
| 4,618,870 A | 10/1986 | Inoue | |
| 4,639,741 A | 1/1987 | Inoue | |
| 4,675,697 A | 6/1987 | Sasaki et al. | |
| 5,305,206 A | 4/1994 | Inoue et al. | |
| 5,860,044 A | 1/1999 | Eki et al. | |
| 6,236,800 B1* | 5/2001 | Nishima et al. | ............... 386/46 |
| 2004/0114476 A1 | 6/2004 | Shen | |
| 2005/0175371 A1* | 8/2005 | Kunugi | ....................... 399/107 |

FOREIGN PATENT DOCUMENTS

EP    1 026 040 A2    8/2000

(Continued)

OTHER PUBLICATIONS

Machine translation of Tachibana (JP2005-305819) Listed in IDS.*

*Primary Examiner*—David M Gray
*Assistant Examiner*—Rodney Bonnette
(74) *Attorney, Agent, or Firm*—Oblon, Spivak, McClelland, Maier & Neustadt, L.L.P.

(57) ABSTRACT

An image forming apparatus is disclosed. The image forming apparatus includes an operations section that operates the image forming apparatus, the operations section being rotatably supported by an apparatus main body; an operations section holding unit that holds the operations section at a predetermined angle with respect to the apparatus main body; an external force detecting unit that detects an external force applied to the operations section in a rotational direction of the operations section; an operations section rotating unit that rotates the operations section in a direction of the external force; and a control unit to activate the operations section rotating unit in response to detection of the external force by the external force detecting unit.

14 Claims, 10 Drawing Sheets

FOREIGN PATENT DOCUMENTS

| | | |
|---|---|---|
| EP | 1 367 453 A2 | 12/2003 |
| EP | 1 454 796 A2 | 9/2004 |
| JP | 62 153871 | 7/1987 |
| JP | 1-174788 | 12/1989 |
| JP | 4 165365 | 6/1992 |
| JP | 05 058492 | 3/1993 |
| JP | 05-313746 | 11/1993 |
| JP | 06 090944 | 4/1994 |
| JP | 6 121080 | 4/1994 |
| JP | 07 295429 | 11/1995 |
| JP | 10-11138 | 1/1998 |
| JP | 11 027453 | 1/1999 |
| JP | 2000 015891 | 1/2000 |
| JP | 2000-89322 | 3/2000 |
| JP | 2000-356069 | 12/2000 |
| JP | 2001 245136 | 9/2001 |
| JP | 2002 361968 | 12/2002 |
| JP | 2003 087463 | 3/2003 |
| JP | 2003 094769 | 4/2003 |
| JP | 2003 323084 | 11/2003 |
| JP | 2003 337506 | 11/2003 |
| JP | 2003 345086 | 12/2003 |
| JP | 2003 345087 | 12/2003 |
| JP | 2004 085762 | 3/2004 |
| JP | 2004 191826 | 7/2004 |
| JP | 2004 258149 | 9/2004 |
| JP | 2005010394 A * | 1/2005 |
| JP | 2005 305819 | 11/2005 |
| WO | WO 03/069625 A1 | 8/2003 |

* cited by examiner

IMAGE FORMING APPARATUS

TECHNICAL FIELD

The present invention generally relates to an image forming apparatus, such as an electrophotographic copy machine, a fax machine, a printer, a plotter, and a printing machine, and particularly relates to a variable angle mechanism of an operations section.

BACKGROUND ART

Image forming apparatuses such as electrophotographic copy machines, fax machines, printers, plotters, and printing machines often have operations sections (operations panels) fixed at an angle with respect to exterior panels of apparatus bodies in view of the visual field of users during use and usability. However, since the operations sections are fixed, reduction of visibility of display sections, which show various kinds of information, provided in the operations section may occur due to reflection of room light or the like. In recent years and continuing, more and more wheelchair users are participating in society. Many of the operations sections of the image forming apparatuses are mounted on the apparatus top faces, so that the operations sections are too high for the wheelchair users to use. In view of such problems, image forming apparatuses having variable angle mechanisms for adjusting the angle of operations sections with respect to exterior panels of apparatus bodies are disclosed in Patent Documents 1 and 2, for example.

<Patent Document 1> Japanese Patent Laid-Open Publication No. 2003-345087

<Patent Document 2> Japanese Patent Laid-Open Publication No. 2003-337506

The image forming apparatus disclosed in Patent Document 1 includes an operations section rotatably mounted with respect to an apparatus body, and an angle holding member interposed between the operations section and the apparatus body. It is, however, difficult to adjust the angle with this configuration. The image forming apparatus disclosed in Patent Document 2 is provided with an angle holding member including a torque limiter for maintaining the position of an operations section, but does not have a function for adjusting the operations section to the same position again. Moreover, because a force greater than holding force of the torque limiter needs to be applied to move the operations section, it is not easy to adjust the angle of the operations section.

DISCLOSURE OF THE INVENTION

The present invention may solve at least one problem described above. The present invention is directed to an image forming apparatus that allows easy angle adjustment of an operations section and can reproduce the adjusted angle.

According to an aspect of the present invention, there is provided an image forming apparatus that comprises an operations section for operating the image forming apparatus, the operations section being rotatably supported by an apparatus main body; an operations section holding unit to hold the operations section at a predetermined angle with respect to the apparatus main body; an external force detecting unit to detect an external force applied to the operations section in a rotational direction of the operations section; an operations section rotating unit to rotate the operations section in a direction of the external force; and a control unit to activate the operations section rotating unit in response to a detection of the external force by the external force detecting unit.

According to this aspect of the present invention, since the operations section is rotated in the same direction as the external force by the operations section rotating unit while the external force is applied to the operations section, operators can easily position the operations section at a desired position. The external force detecting unit preferably detects a force greater than a predetermined value applied to the operations section as the external fore. With this configuration, the operator can easily rotate the operations section as desired.

The control unit preferably positions the operations section at a stop position according to a detection signal from a position detecting unit. It is therefore possible to place the operations section at the same stop position again and improve operability of the image forming apparatus.

The external force detecting unit preferably does not detect a force due to the weight of the operations section as the external force. With this configuration, the operator can perform upward rotation and downward rotation of the operations section without feeling much difference in force required.

It is also preferable that the above-described image forming apparatus further comprise an operations section detecting unit to detect an operation being performed on the operations section, wherein the control unit negates the detection of the external force by the external force detecting unit while the operation on the operations section is detected by the operations section detecting unit. With this configuration, rotation of the operations section does not occur when force is applied to the operations section for the purpose of operating the image forming apparatus. It is therefore possible to improve the operability of the image forming apparatus and prevent the operator from danger due to unexpected rotation of the operations section.

It is also preferable that the image forming apparatus further comprise a braking unit that applies a brake to the operations section rotating unit. With this configuration, the operations section can be stopped at a desired position, thereby improving the positioning accuracy of the operations section.

BEST MODE FOR CARRYING OUT THE INVENTION

Figure 1:
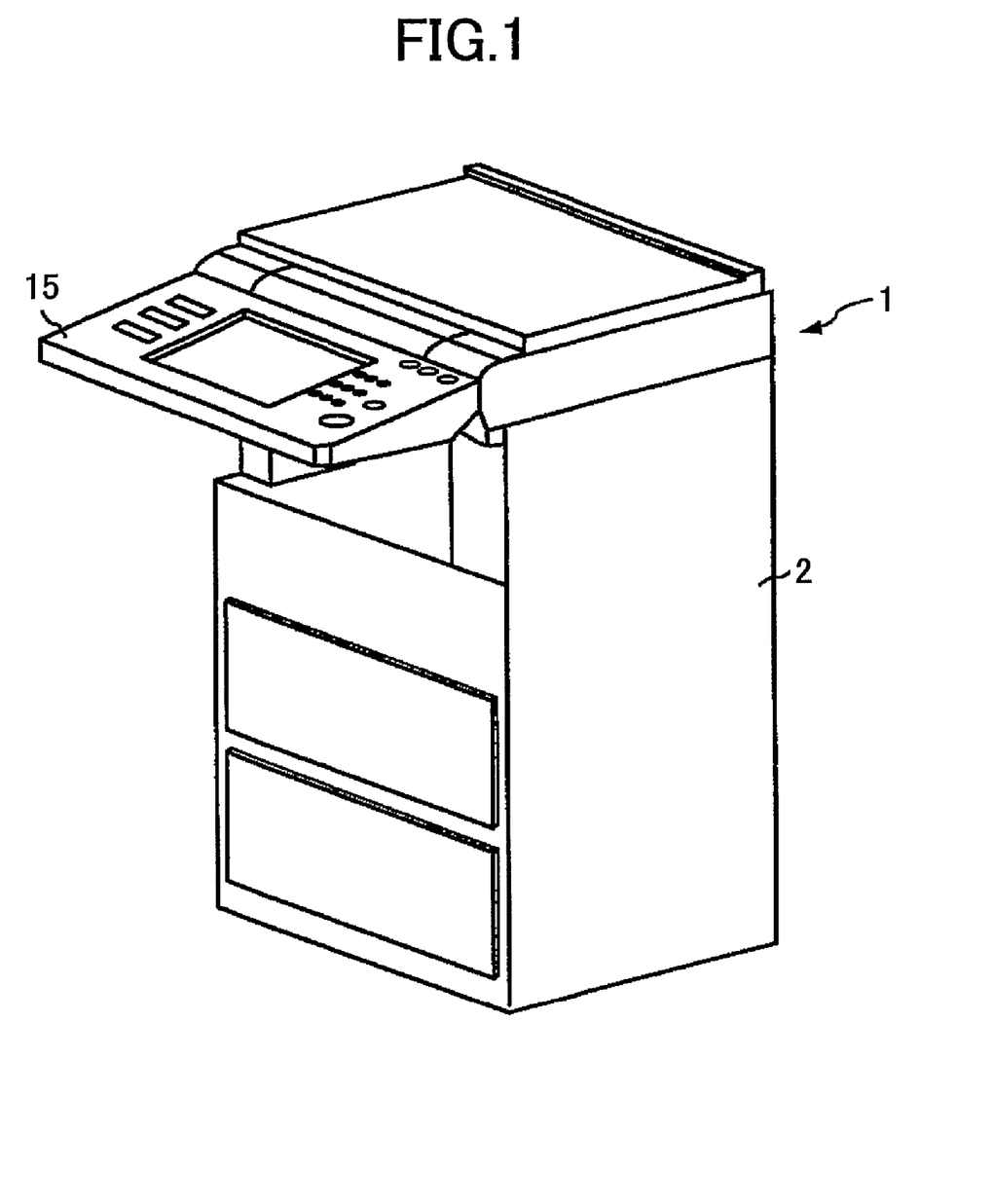
FIG. 1 is a schematic perspective view illustrating an image forming apparatus according to first and second embodiments of the present invention.
Figure 2:
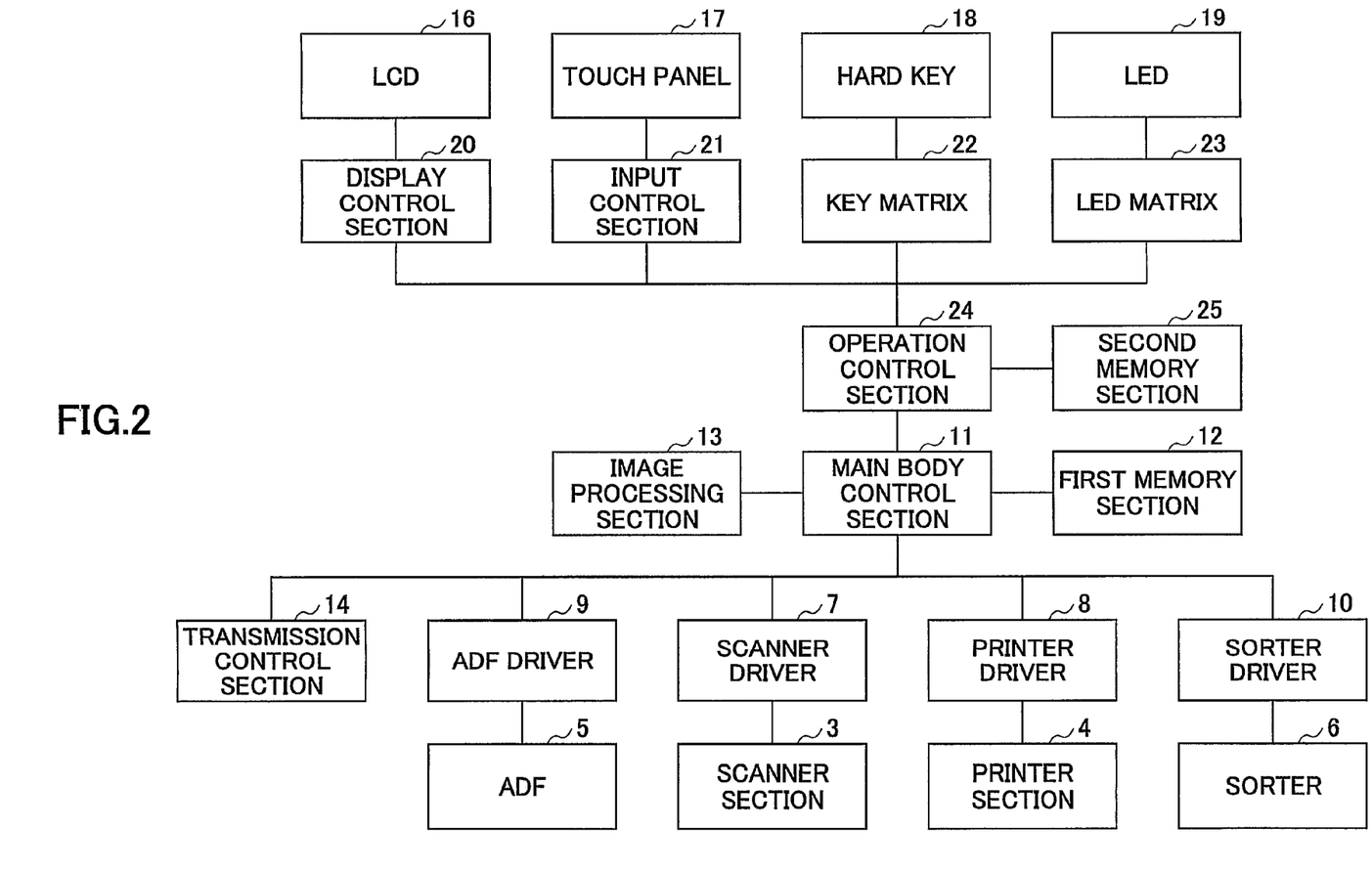
FIG. 2 is a functional block diagram of an image forming apparatus according to the first and second embodiments of the present invention.

FIG. 1 is a schematic perspective view illustrating an image forming apparatus 1 according to a first embodiment of the present invention. FIG. 2 is a functional block diagram of the image forming apparatus 1 of FIG. 1. With reference to FIGS. 1 and 2, the image forming apparatus 1, which is an electrophotographic copying machine, comprises a scanner section 3 for scanning document images, a printer section 4 for outputting images, and so on inside an apparatus main body 2. Although not shown in FIG. 1, an ADF 5 for feeding documents one after another is disposed on the upper side of the scanner section 3. A sorter 6 for sorting and collating sheets is disposed at a sheet discharge section (not shown) from which the sheets with images formed thereon are discharged. The scanner section 3, the printer section 4, the ADF 5, and the sorter 6 are driven by a scanner driver 7, a printer driver 8, an ADF driver 9, and a sorter driver 10, respectively. The drivers 7-10 are controlled by a main body control section 11. A first memory section 12 is connected to the main body control section 11. The first memory section 12 stores a sequence control program executed by the main body control section 11, files for interpreting input signals from an operations panel 15 (described below), etc. In this embodiment, an image processing section 13 is also connected to the main body control section 11. The image processing section 13 can perform image processing, such as UCR, edge enhancement, and zoom, on image data read by the scanner section 3. Further, a transmission control section 14 for image transmission via LANs, fax machines, etc., is also connected to the main body control section 11.

Figure 4:
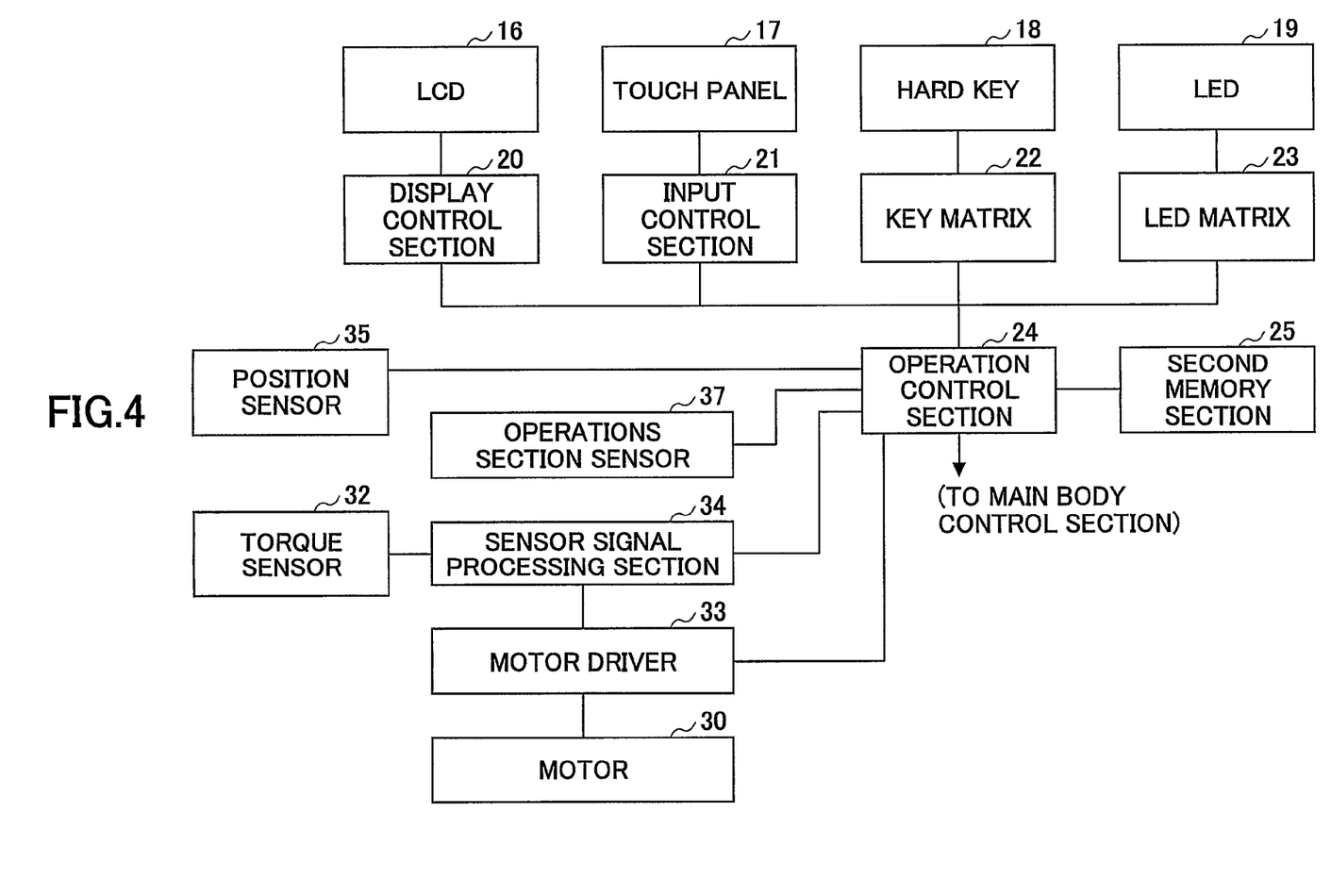
FIG. 4 is a functional block diagram of an operations section according to the first and second embodiments of the present invention.

The operations panel 15 as an operations section is disposed on the front part of the apparatus main body 2. Referring to FIG. 2, an LCD 16, a touch panel 17, hard keys 18, and LEDs 19 are disposed on the upper surface of the operations panel 15, and are controlled by a display control section 20, an input control section 21, a key matrix 22, and an LED matrix 23, respectively, disposed inside the operations panel 15. An operation control section 24 as a control unit for controlling the control sections 20, 21 and the matrices 22, 23, a second memory section 25, etc., are also provided. The operation control section 24 communicates with the main body control section 11 to transmit and receive input information, display data, etc. As shown in FIG. 4, the operation control section 24 is connected to a motor driver 33 for controlling the operation of a motor 30 (described below) and to a sensor signal processing section 34 for processing signals from a torque sensor 32 (described below).

Figure 3A:
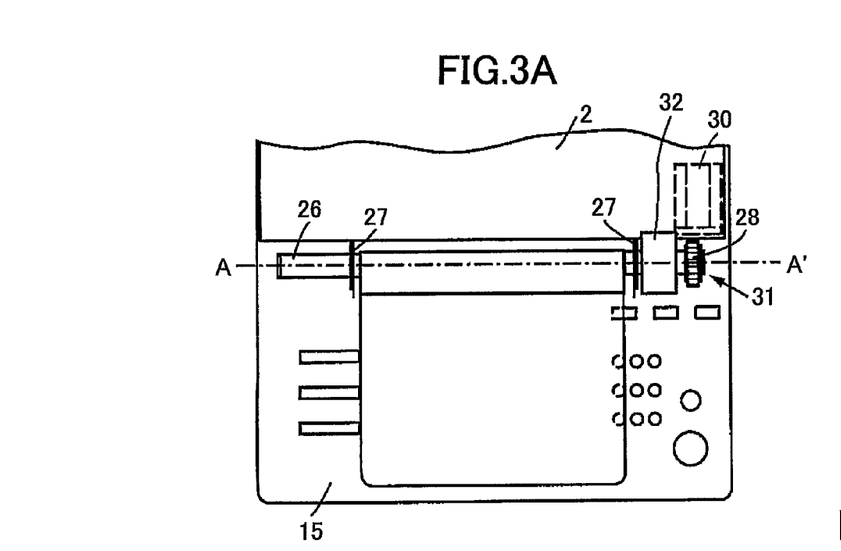
FIGS. 3A, 3B, and 3C are a schematic plan view, a schematic cross-sectional view, and a schematic perspective view, respectively, illustrating a rotary mechanism of an operations section according to the first and second embodiments of the present invention.
Figure 3B:
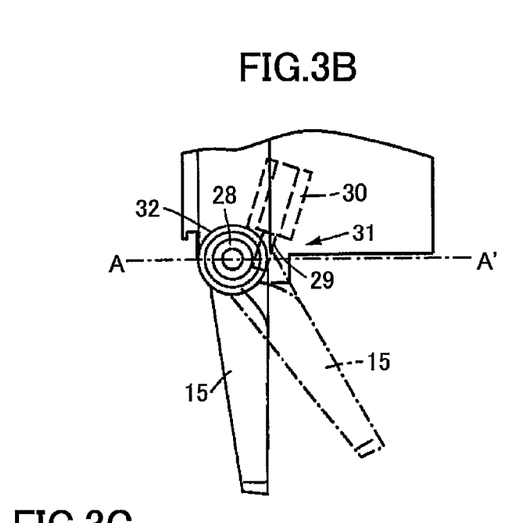
Figure 3C:
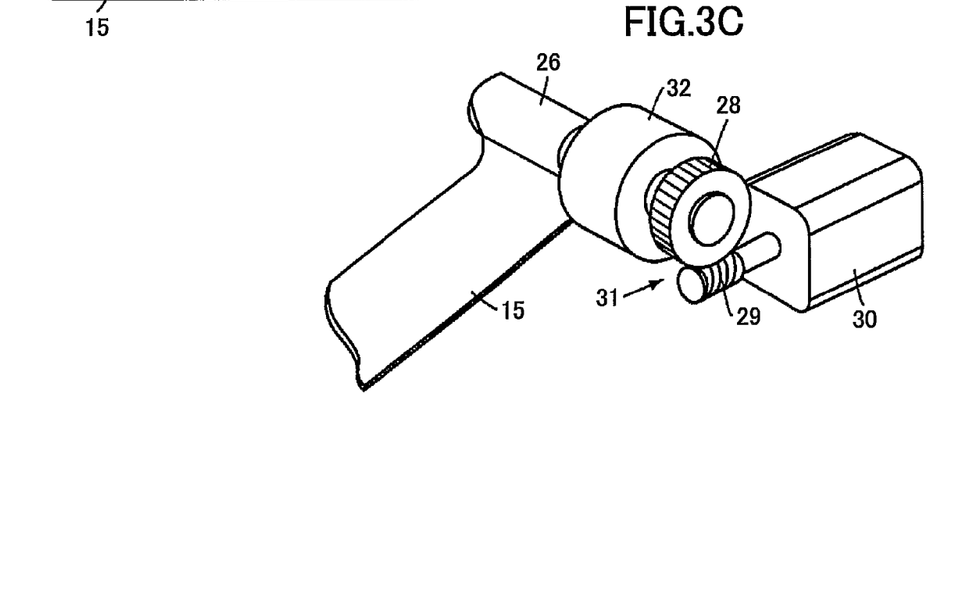

Referring to FIGS. 3A-3C, the operations panel 15 integrally includes a rotary shaft 26, which is rotatably supported by support members 27 disposed on the apparatus main body 2. A worm wheel 28 is attached to an end of the rotary shaft 26. The motor 30 rotatable in both directions is disposed on the apparatus main body 2, and includes a worm 29 at an output shaft thereof for meshing with the worm wheel 28. With the above-described configuration, the operations panel 15 is held stationary when the motor 30 is not running. On the other hand, when the motor 30 is running, the operations panel 15 rotates between a horizontal position where the upper surface of the operations panel 15 is substantially even with the upper surface of the apparatus main body 2 and a vertical position where the upper surface of the operations panel 15 is substantially parallel to the front surface of the apparatus main body 2. The worm wheel 28 and the worm 29 form an operations section holding unit 31, and the motor 30 serves as an operations section rotating unit. The operation of the motor is controlled by the operation control section 24 through the motor driver 33.

The torque sensor 32 as an external force detecting unit is attached to the rotary shaft 26. The torque sensor 32 may be any of well-known torque sensors that can detect, when an upward external force is applied from the upper surface of the operations panel or when a downward external force is applied from the lower surface of the operations panel 15, the direction and magnitude of the external force as a torque on the rotary shaft 26. The torque sensor 32 is connected to the operation control section 24 via the sensor signal processing section 34 as shown in FIG. 4 so as to output a voltage having a polarity and a magnitude corresponding to the direction and magnitude of the external force to the operation control section 24.

With the above-described configuration, when an operator using the image forming apparatus 1 pushes the upper surface of the operations panel 15 downward or pushes the lower surface of the operations panel 15 upward, the torque sensor 32 detects the pushing force as an external force and outputs a detection voltage having a polarity and a level corresponding to the external force to the operation control section 24. In response to the detection voltage, the operation control section 24 rotates the motor 30 in the normal direction or the reverse direction depending on the polarity of the detection voltage. When the operator stops pushing the operations panel 15, no torque is detected by the torque sensor 32. Thus, the output of the detection voltage to the operation control section 24 is stopped, so that the operation control section 24 stops the motor 30.

With this configuration, while the external force is applied to the operations panel 15 by the operator, the motor 30 drives the operations panel 15 to rotate in the same direction as the external force. Therefore, the operations panel 15 can be easily positioned at a position desired by the operator. The motor 30 may be driven when the detection voltage output from the torque sensor 32 to the operation control section 24 is greater than a voltage level corresponding to the pushing force that can be easily produced by the operator. With this configuration, the operator can easily rotate the operations panel 15 as desired. An encoder (not shown) for detecting the rotational angle of the rotary shaft 26 may be provided such that the angle of the operations panel 15 calculated based on the rotational angle of the rotary shaft 26 is shown on the LCD 16, for example. It is thus possible to reproduce the adjusted angle and improve operability of the image forming apparatus 1.

Although the external force is the pushing force that pushes the upper surface of the operations panel 15 downward and the pushing force that pushes the lower surface of the operations panel 15 upward in this embodiment, the external force may be a pulling force that pulls the upper surface of the operations panel 15 downward and a pulling force that pulls the lower surface of the operations panel 15 upward if, for example, a handle(s) is attached to the upper surface and/or the lower surface of the operations panel 15.

Figure 5:
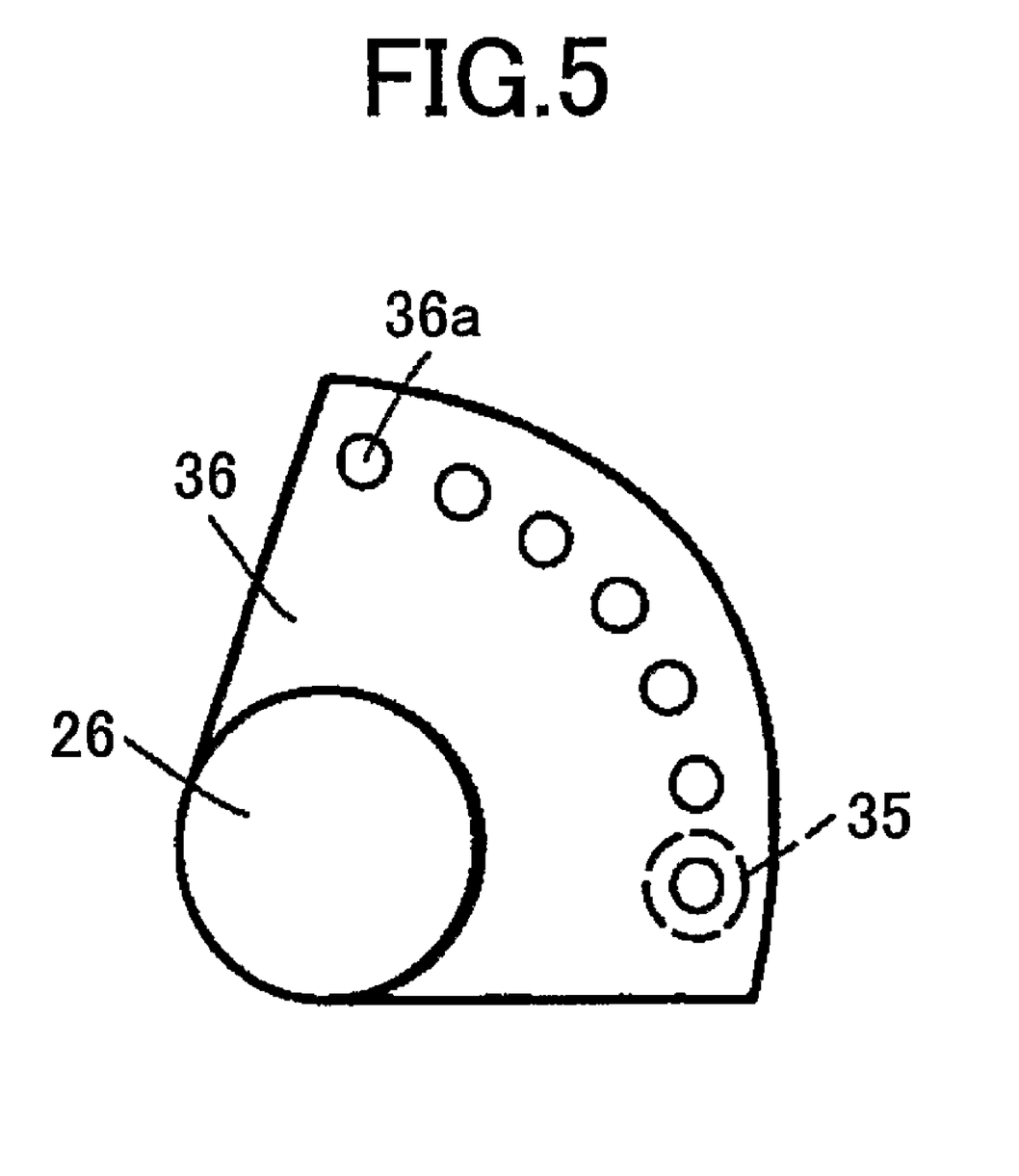
FIG. 5 is a schematic view illustrating a position sensor and a light shielding plate according to the second embodiment of the present invention.

FIG. 5 illustrates a position sensor 35 and a light shielding plate 36 as a position detecting unit according to a second embodiment of the present invention. The second embodiment is the same as the first embodiment except that the position sensor 35 and the light shielding plate 36 are used, and that control performed by the operation control section 24 is different.

The position sensor 35 is a transmissive sensor. The position sensor 35 includes a light emitting element and a light receiving element, which are spaced apart by a predetermined distance and attached to the apparatus main body 2. The light shielding plate 36 is attached to the rotary shaft 26 so as to extend toward the apparatus main body 2, and is interposed between the elements of the position sensor. The light shielding plate 36 has holes 36a at every predetermined angle (15 degrees in FIG. 5). The position sensor 35 outputs a signal when any one of the holes 36a of the light shielding plate 36 reaches the position corresponding to the position sensor 35 due to rotation of the operations panel 15. The signal output from the position sensor 35 is input to the operation control section 24 as shown in FIG. 4.

When a detection voltage is output to the torque sensor 32 in response to detection of an external force applied to the operations panel 15, the operation control section 24 drives the motor 30 so as to rotate the operations panel 15 in the direction of the external force. This rotation continues while the light emitting element and the light receiving elements are blocked by the light shielding plate 36 and therefore output of the signal from the position sensor 35 is stopped. When another hole 36a reaches the position between the light emitting element and the light receiving element, the position sensor 35 outputs the signal again. In response to this signal, the operation control section 24 stops the motor 30. That is, the holes 36a correspond to stop positions of the operations panel 15. With this configuration, the operator can rotate the operations panel 15 by a predetermined angle without continuously pushing the operations panel 15. Also, it is possible to place the operations panel 15 at the same stop position again and improve the operability of the image forming apparatus 1.

In a modified embodiment, a predetermine rotational angle (increments of 15 degrees) corresponding to the distance between the adjacent holes 36a is selected on the operations panel 15 so as to be stored in the second memory section 25. Thus, the operation control section 24 drives the motor 30 such that the operations panel 15 is rotated by the selected rotational angle. If the selected angle is 45 degrees, the motor 30 is stopped upon reception of the signal from the position sensor 35 after the third interruption of the signal. If the selected angle is 75, the motor 30 is stopped upon reception of the signal from the position sensor 35 after the fifth interruption of the signal. With this configuration, the operations panel 15 can be rotated by a predetermined angle in one operation. Also, it is possible to place the operations panel 15 at the same stop position again and further improve the operability of the image forming apparatus 1.

In the above described embodiments, in order to reduce the burden of the operator, the motor 30 may be driven when the external force detected by the torque sensor 32 is greater than a predetermined level corresponding to the pushing force that can be easily produced by the operator. However, since external force due to the weight of the operations panel 15 is applied to the rotary shaft 26, the torque sensor 32 outputs detection voltage corresponding to the weight of the operations panel 15. If no correction is made for this detection voltage, the operation control section 24 determines that downward external force is constantly applied and drives the motor 30.

Figure 6:
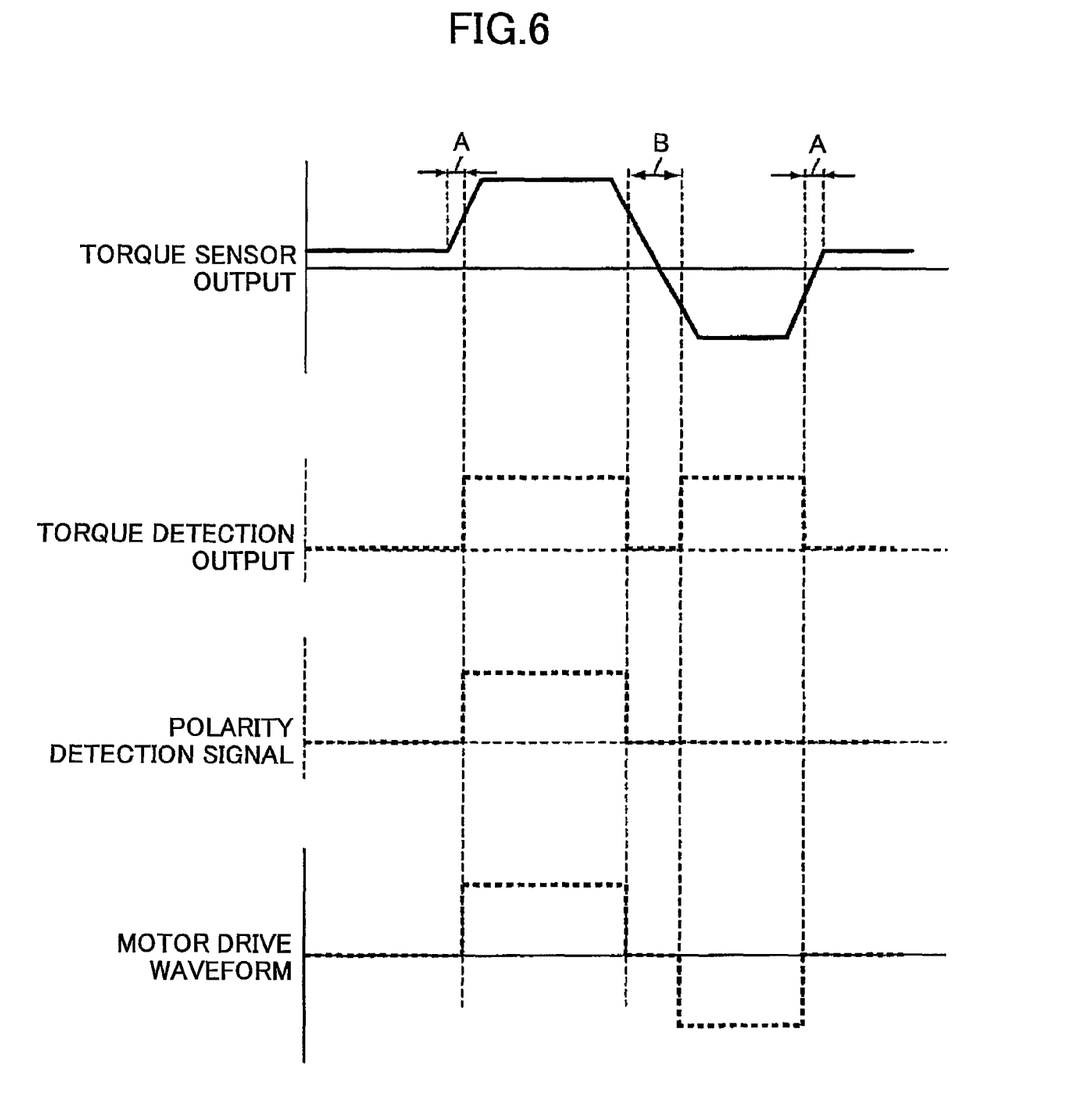
FIG. 6 is a timing chart illustrating a motor control method according to a modified embodiment of the present invention.
Figure 7:
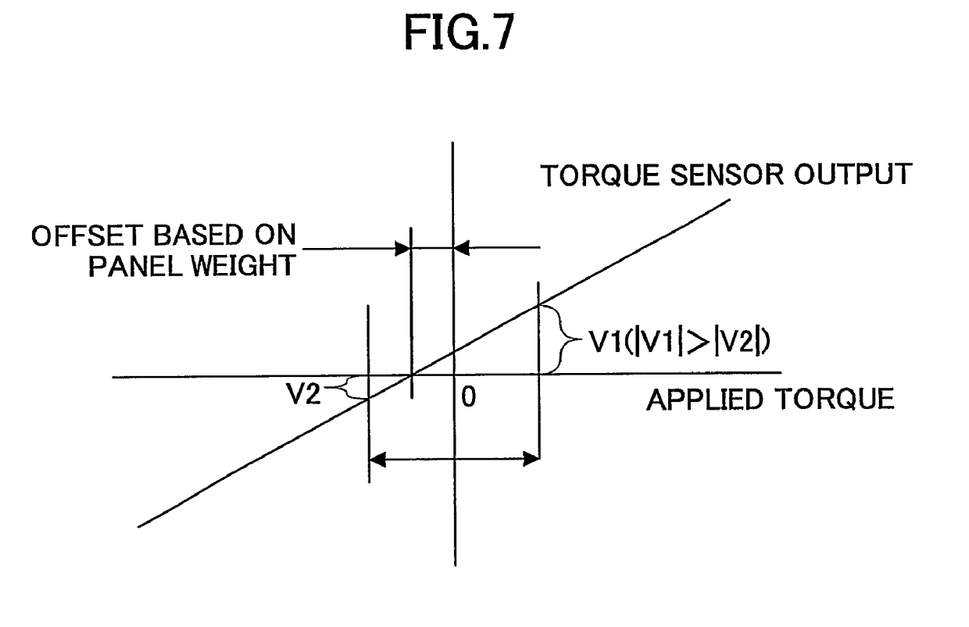
FIG. 7 is a graph illustrating a detection threshold of a torque sensor according to a modified embodiment of the present invention.

This detection voltage may be corrected as follows. Referring to FIG. 6, invalid zones A and B are provided in the detection voltage from the torque sensor 32. Thus, the operation control section 24 determines that the intended external force is applied when voltage greater than a predetermine level is output as the detection voltage. The correction for the external force can be made in this way. Still, if the correction amount for upward rotation and the downward rotation is the same, a greater external force is required for the upward rotation than the downward rotation due to the weight of the operations panel 15, which gives the operator an impression of imbalance. In one embodiment, to solve this problem, a threshold based on the weight of the operations panel 15 is set as shown in FIG. 7. Thus, the operator can perform upward rotation and downward rotation of the operations panel 15 without feeling much difference in force required.

In the above described embodiments, when the operator presses the touch panel 17, the hard keys 18, etc., on the operations panel 15 to operate the image forming apparatus 1, the torque sensor 32 might detect such pressing force as external force and activate the motor 30 to rotate the operations panel 15 downward.

Figure 8:
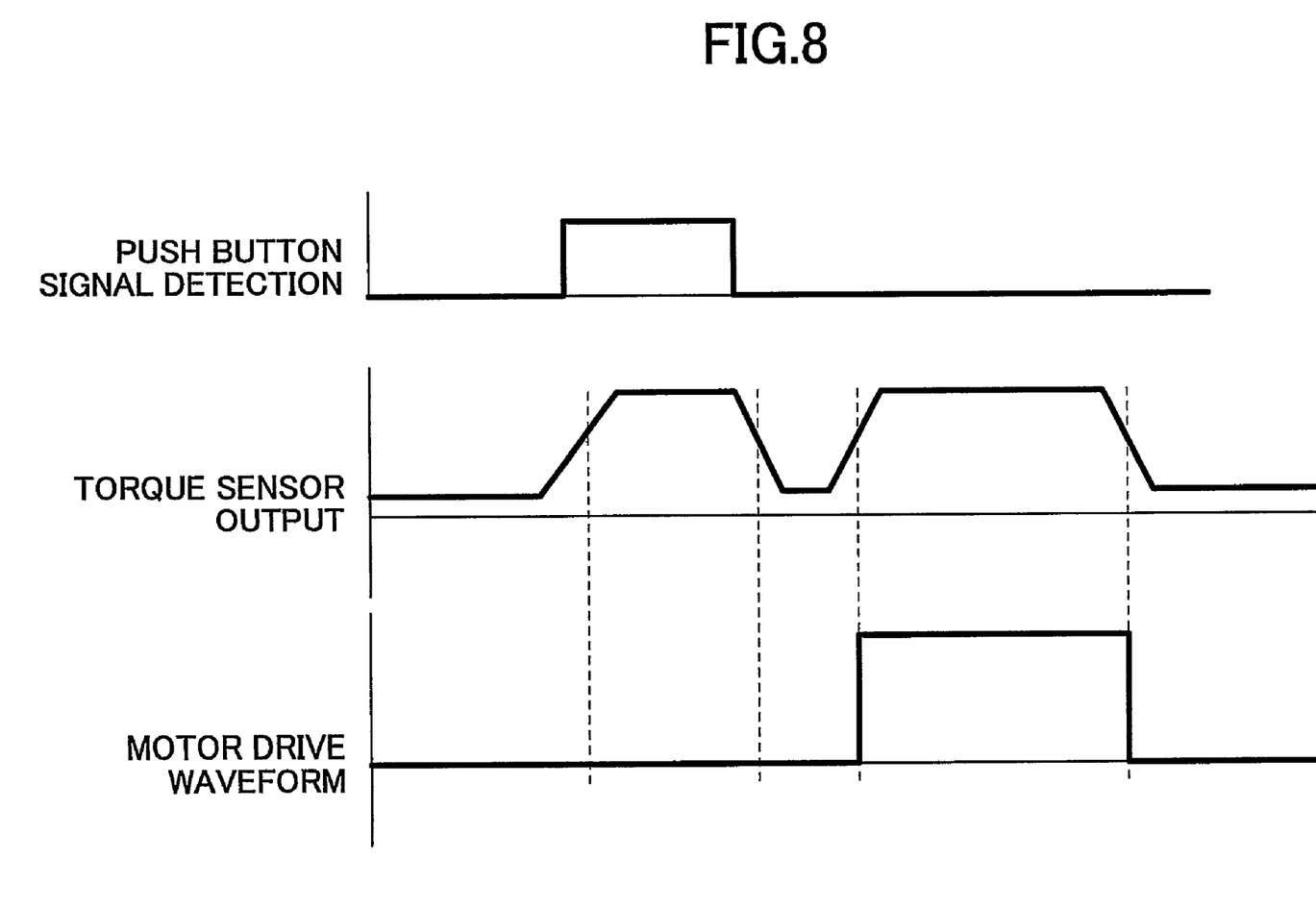
FIG. 8 is a timing chart illustrating a motor control method according to a modified embodiment of the present invention.
Figure 9:
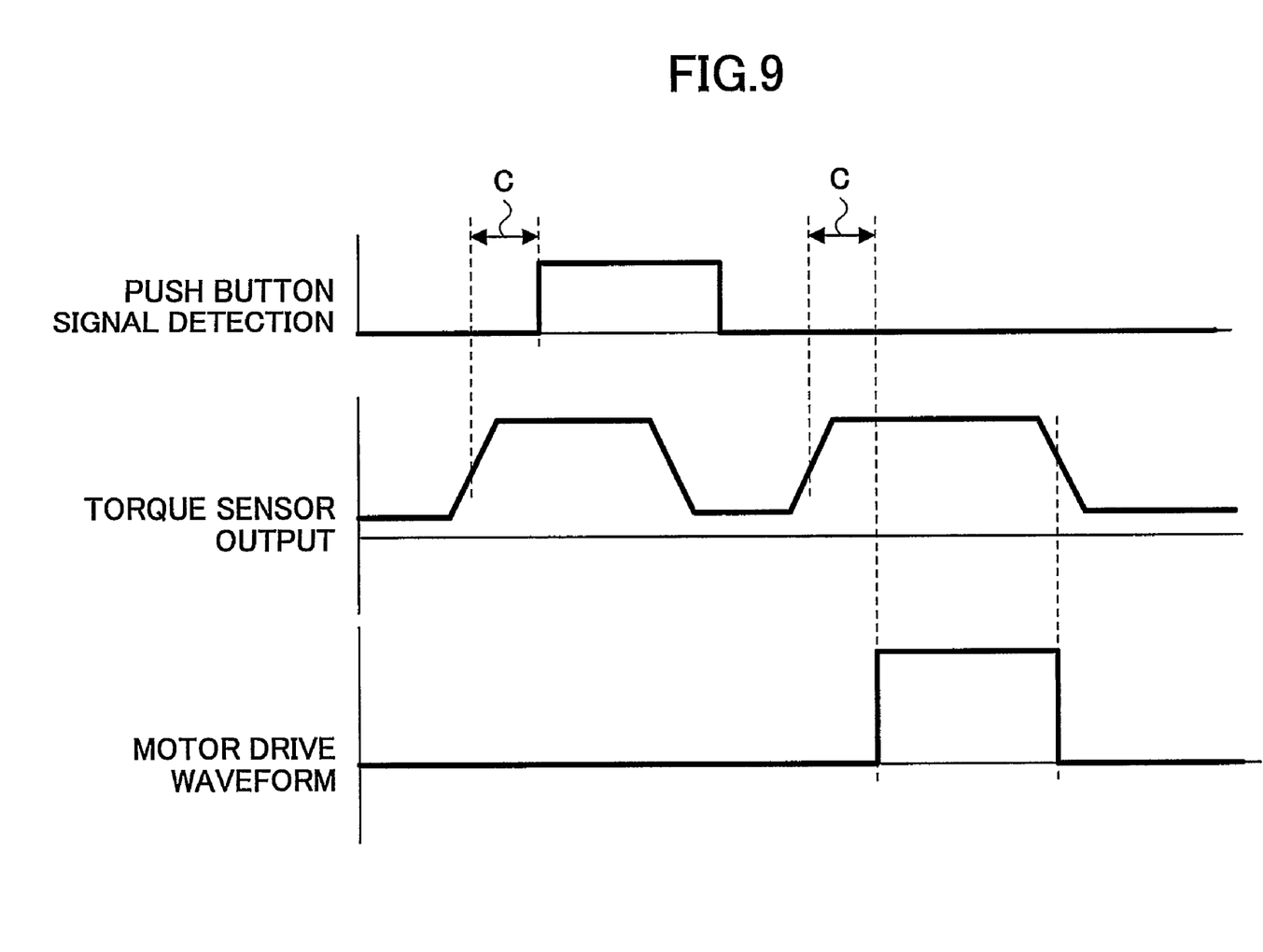
FIG. 9 is a timing chart illustrating a motor control method according to a modified embodiment of the present invention.

In a modified embodiment, to solve such a problem, an operations section sensor 37 as an operations section detecting unit is provided in the operations panel 15. The operations section sensor 37 detects pressing force applied to parts for operating the image forming apparatus 1, and outputs a signal to the operation control section 24 of FIG. 4. As shown in FIG. 8, the operation control section 24 negates signals from the torque sensor 32 while receiving the signal from the operations section sensor 37. With this configuration, rotation of the operations panel 15 does not occur when pressing force greater than the force required for rotating the operations panel 15 is applied to the operations panel 15 for the purpose of operating the image forming apparatus 1. It is therefore possible to improve the operability of the image forming apparatus 1 and protect the operator from danger due to unexpected rotation of the operations panel 15.

In a modified embodiment of the above-described embodiment, the operation control section 24 does not actuate the motor 30 when a signal is input from the operations section sensor 37 within a specified time C after detection of external force by the torque sensor 32, but actuates the motor 30 when a signal is input from the operations section sensor 37 within the specified time C after detection of external force. With this configuration, when the operator operates the image forming apparatus 1 after trying to rotate the operations panel 15, rotation of the operations panel 15 does not occur. Accordingly, the operator is protected from danger.

In one embodiment, if a signal from the operations section sensor 37 is input to the operation control section 24 during rotation of the operations panel 15 by the motor 30 actuated by the operation control section 24 in response to detection of external force by the torque sensor 32, the operation control section 24 ignores the signal to continue driving the motor 30. In an alternative embodiment, if a signal from the operations section sensor 37 is input during rotation of the operations panel 15, the motor 30 is brought to an emergency stop by the operation control section 24.

In the above-described embodiments, since the worm 29 attached to the output shaft of the motor 30 and the worm wheel 28 attached to the rotary shaft 26 form the operations section holding unit 31 as a speed reduction mechanism, inertial force between the motor 30 and the operations section holding unit 31 is large. Therefore, rotation of the operations panel 15 does not stop immediately when the external force is removed or when a signal is input from the position sensor 35. As a result, the operations panel 15 is rotated further than intended.

Figure 10:
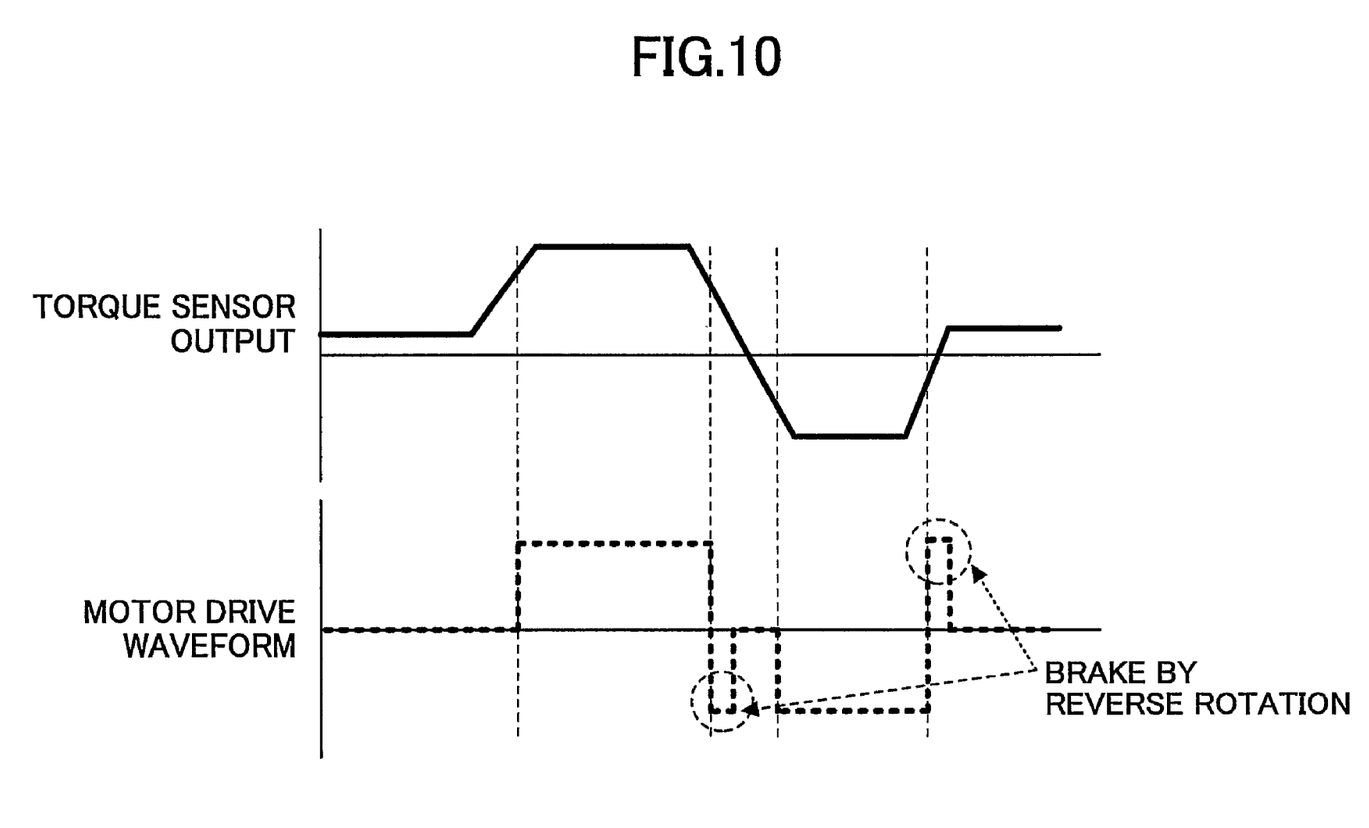
FIG. 10 is a timing chart illustrating a motor control method according to a modified embodiment of the present invention.

In one embodiment, to solve this problem, a braking unit is provided that applies a brake to the motor when trying to stop the motor 30. It is therefore possible to stop the operations panel 15 at a desired position, thereby improving positioning accuracy. Examples of the braking unit may include mechanisms that mechanically apply friction to the motor 30, electromagnetic brakes, and brakes that can reverse the motor 30 with application of reverse phase voltage, etc. FIG. 10 shows a control waveform of the motor 30 produced upon application of a brake to the motor 30 by reverse rotation. Further, it is well known to apply a brake by short-circuiting motor terminals. The same effects can be achieved by short-circuiting terminals of the motor 30 at the points shown in FIG. 10.

Although the electrophotographic copy machine is illustrated as an example of the image forming apparatus in the above embodiments, the image forming apparatus may be other types of image forming apparatuses, such as fax machines, printers, plotters, and printing machines, that have operations sections.

The present application is based on Japanese Priority Application No. 2005-074053 filed on Mar. 15, 2005, with the Japanese Patent Office, the entire contents of which are hereby incorporated by reference.

The invention claimed is:

1. An image forming apparatus, comprising:
   an operations section to operate the image forming apparatus, the operations section being rotatably supported by an apparatus main body;
   an operations section holding unit to hold the operations section at a predetermined angle with respect to the apparatus main body;
   an external force detecting unit to detect an external force applied to the operations section in a rotational direction of the operations section;
   an operations section rotating unit to rotate the operations section in a direction of the external force; and
   a control unit to activate the operations section rotating unit in response to a detection of the external force by the external force detecting unit.

2. The image forming apparatus as claimed in claim 1, wherein the control unit activates the operations section rotating unit only while the external force is detected by the external force detection unit.

3. The image forming apparatus as claimed in claim 1, further comprising:
   a position detecting unit to detect arrivals of the rotating operations section at a plurality of stop positions;
   wherein, in response to the detection of the external force by the external force detecting unit, the control unit activates the operations section rotating unit until the position detecting unit detects a first arrival of the operations section at one of the stop positions.

4. The image forming apparatus as claimed in claim 1, further comprising:
   a position detecting unit to detect arrivals of the rotating operations section at a plurality of stop positions;
   wherein, in response to the detection of the external force by the external force detecting unit, the control unit activates the operations section rotating unit until the position detecting unit detects an arrival of the operations section at a predetermined one of the stop positions.

5. The image forming apparatus as claimed in claim 1, wherein the external force detecting unit detects a force greater than a predetermined value applied to the operations section as the external force.

6. The image forming apparatus as claimed in claim 5, wherein the external force detecting unit does not detect a force due to a weight of the operations section as the external force.

7. The image forming apparatus as claimed in claim 1, further comprising:
   an operations section detecting unit to detect an operation being performed on the operations section;
   wherein the control unit negates the detection of the external force by the external force detecting unit while the operation on the operations section is detected by the operations section detecting unit.

8. The image forming apparatus as claimed in claim 7, wherein if the operations section detecting unit does not detect any operation on the operations section within a predetermined time after the detection of the external force by the external force detecting unit, the control unit activates the operations section rotating unit.

9. The image forming apparatus as claimed in claim 7, wherein if the operations section detecting unit detects the operation on the operations section while the operations section rotating unit is activated, the control unit ignores the detection of the operation on the operations section so as to keep the operations section rotating unit activated.

10. The image forming apparatus as claimed in claim 1, wherein said control unit is configured to apply a brake to the operations section rotating unit.

11. The image forming apparatus as claimed in claim 1, wherein the external force detecting unit outputs a detection voltage.

12. The image forming apparatus as claimed in claim 11, wherein the external force detecting unit detects the detection voltage, which has a polarity corresponding to a direction of the external force and a level corresponding to an amount of the external force.

13. The image forming apparatus as claimed in claim 11, wherein the external force detecting unit includes a torque sensor that outputs the detection voltage.

14. The image forming apparatus as claimed in claim 11, wherein the external force detecting unit detects the detection voltage, which is offset by a weight of the operations section so that an external force required for upward rotation of the operations section and an external force required for downward rotation of the operations section are equivalent.

* * * * *

UNITED STATES PATENT AND TRADEMARK OFFICE
CERTIFICATE OF CORRECTION

| | | |
|---|---|---|
| PATENT NO. | : 7,822,353 B2 | Page 1 of 1 |
| APPLICATION NO. | : 11/547558 | |
| DATED | : October 26, 2010 | |
| INVENTOR(S) | : Kazuo Koike et al. | |

It is certified that error appears in the above-identified patent and that said Letters Patent is hereby corrected as shown below:

On the title page, Item (86), the PCT information is incorrect. Item (86) should read:

-- (86) PCT No.: PCT/JP2006/304527

§ 371 (c)(1),
(2), (4) Date: Oct. 5, 2006 --

Signed and Sealed this
Twenty-eighth Day of December, 2010

David J. Kappos
*Director of the United States Patent and Trademark Office*